United States Patent
Zhang et al.

(10) Patent No.: US 12,509,706 B2
(45) Date of Patent: Dec. 30, 2025

(54) METHODS FOR PREPARING PANTOIC ACID, PANTOTHENIC ACID AND PANTHENOL AS WELL AS SALTS THEREOF

(71) Applicant: Mint Biotechnologies Co., Ltd., Zhejiang (CN)

(72) Inventors: Kechun Zhang, Zhejiang (CN); Jilong Wang, Zhejiang (CN)

(73) Assignee: MINT BIOTECHNOLOGIES CO., LTD., Zhejiang (CN)

( * ) Notice: Subject to any disclaimer, the term of this patent is extended or adjusted under 35 U.S.C. 154(b) by 337 days.

(21) Appl. No.: 18/002,675

(22) PCT Filed: Jun. 28, 2021

(86) PCT No.: PCT/CN2021/102698
§ 371 (c)(1),
(2) Date: Dec. 21, 2022

(87) PCT Pub. No.: WO2022/001939
PCT Pub. Date: Jan. 6, 2022

(65) Prior Publication Data
US 2023/0348941 A1    Nov. 2, 2023

(30) Foreign Application Priority Data
Jun. 28, 2020  (CN) .......................... 202010595583.2

(51) Int. Cl.
| | | |
|---|---|---|
| *C12P 7/42* | (2006.01) | |
| *C12N 1/20* | (2006.01) | |
| *C12N 9/04* | (2006.01) | |
| *C12P 13/02* | (2006.01) | |
| *C12R 1/19* | (2006.01) | |

(52) U.S. Cl.
CPC .................. *C12P 7/42* (2013.01); *C12N 1/20* (2013.01); *C12N 9/0006* (2013.01); *C12P 13/02* (2013.01); *C12R 2001/19* (2021.05); *C12Y 101/01021* (2013.01)

(58) Field of Classification Search
CPC ........................... C12P 7/42; C12Y 101/01021
See application file for complete search history.

(56) References Cited

U.S. PATENT DOCUMENTS 4,020,103 A    4/1977    Trocki

FOREIGN PATENT DOCUMENTS

| CN | 1095105 | A | 11/1994 | |
|---|---|---|---|---|
| CN | 1420931 | A | 5/2003 | |
| EP | 0171046 | A2 | 2/1986 | |
| EP | 2163629 | B1 * | 3/2017 | ............. C12N 15/52 |
| JP | 47-35314 | A | 11/1972 | |
| JP | S4941361 | A | 4/1974 | |
| JP | S5562080 | A | 5/1980 | |

OTHER PUBLICATIONS

Leonardi et al. Progress in Lipid Research 44 (2005) 125-153 (Year: 2005).*
Jarboe, Appl Microbiol Biotechnol (2011) 89:249-257 (Year: 2011).*
Goodhue and Snell, Biochemistry, 1966, vol. 5, No. 2, pp. 403-408 (Year: 1966).*
Lee et al. Journal of Microbiology (2013) vol. 51, No. 4, pp. 527-530 (Year: 2013).*
CAS Common Chemistry. CAS, a division of the American Chemical Society, n.d. CAS RN: 7300-60-9 (Year: 2025).*
Nag and Das, Journal of Aoac International vol. 75, No. 5, 1992, pp. 898-901 (Year: 1992).*

* cited by examiner

*Primary Examiner* — Melenie L Gordon
*Assistant Examiner* — Jessica Faye Edwards
(74) *Attorney, Agent, or Firm* — NKL Law; Allen Xue

(57) ABSTRACT

Pantoic acid is obtained by fermenting substrate 2-hydroxy-3,3-dimethyl-4-aldehydobutyric acid by using bacteria or yeast. A microorganism is selected from bacteria or fungi. The microorganism is selected from wild or genetically engineered *Escherichia coli*, *Bacillus*, *Corynebacterium*, yeast or *Streptomyces*. Pantothenic acid is obtained by chemically reacting the pantoic acid obtained by the method described above with β-alanine. Panthenol is obtained by chemically reacting the pantoic acid obtained by the method described above with β-alaninol.

8 Claims, No Drawings

Specification includes a Sequence Listing.

METHODS FOR PREPARING PANTOIC ACID, PANTOTHENIC ACID AND PANTHENOL AS WELL AS SALTS THEREOF

CROSS-REFERENCE TO RELATED APPLICATIONS

This application is a U.S. national stage entry of PCT International Application No. PCT/CN2021/102698, filed on Jun. 28, 2021, which claims the priority of Chinese Patent Application No. 202010595583.2 filed with China National Intellectual Property Administration on Jun. 28, 2020 and entitled "METHODS FOR PREPARING PANTOIC ACID, PANTOTHENIC ACID AND PANTHENOL AS WELL AS SALTS THEREOF", the content of which is incorporated herein by reference in its entirety.

INCORPORATION OF SEQUENCE LISTING

This application contains a sequence listing submitted in Computer Readable Form (CRF). The CRF file contains the sequence listing entitled "PA150.0193_ST25.txt", which was created on Aug. 28, 2025, and is 1,308 bytes in size. The information in the sequence listing is incorporated herein by reference in its entirety.

TECHNICAL FIELD

The present application relates to the technical field of biochemical synthesis, and in particular to a preparation method for pantoic acid, pantothenic acid and panthenol as well as salts thereof.

BACKGROUND

Pantothenic acid is also known as vitamin B5. Pantoic acid is an important intermediate for the production of pantothenic acid and panthenol. D-calcium pantothenate is the most commercially important product form of D-pantothenic acid and has been widely used in the pharmaceutical, feed and food industries. D-pantothenic acid or vitamin B5 is a member of the vitamin B complex, which is naturally required by mammals. In cells, pantothenic acid is mainly used for the biosynthesis of coenzyme A (CoA) and acyl carrier protein (ACP). These coenzymes are important for all cells and are involved in over 100 different intermediate reactions in cellular metabolism. Panthenol is one of pantothenic acid derivatives, and D-panthenol is mainly used for preparing hair care products and topical cosmetics, and can be used for preventing and treating small wrinkles, inflammation, sunburn and erosion, preventing alopecia, and promoting hair growth.

The existing synthesis method for D-calcium pantothenate comprises steps of reacting β-alanine, α-hydroxy-β,β'-dimethyl-γ-butyrolactone (pantolactone) and metallic calcium to generate DL-calcium pantothenate, and then separating the DL-calcium pantothenate to obtain D-calcium pantothenate. The pantolactone is prepared mainly by the isobutyraldehyde-formaldehyde-hydrocyanic acid method (U.S. Pat. No. 4,020,103, 1977; JP.47-35314, 1973; JP.49-41361, 1974) and the isobutyraldehyde-aldehyde acetic acid method (JP.55-62080, 1980). The isobutyraldehyde-formaldehyde-hydrocyanic acid method comprises subjecting isobutyraldehyde and formaldehyde to methylolation to prepare α,α-dimethyl-β-hydroxypropionaldehyde, subjecting α,α-dimethyl-β-hydroxypropionaldehyde and hydrocyanic acid to a cyanohydrin reaction to generate α,γ-dihydroxy-β,β-dimethyl butyronitrile, subjecting the α,γ-dihydroxy-β,β-dimethyl butyronitrile to acid hydrolysis to obtain α,γ-dihydroxy-β,β-dimethylbutyric acid (pantoic acid), and then subjecting the α,γ-dihydroxy-β,β-dimethylbutyric acid to dehydration and lactonization to obtain DL-pantolactone. The so-called isobutyraldehyde-glycolonitrile method is actually an improvement of the above method, in which glycolonitrile is used instead of hydrocyanic acid directly, but glycolonitrile is still obtained by the addition of formaldehyde and hydrocyanic acid. The method has the main problems that a plurality of reactions such as hydroxymethylation, cyanohydrin, hydrolysis, lactonization and the like are required, poisonous hydrocyanic acid is used in the reaction, the technical requirement is high, great troubles are brought to management and use, and the cost required for taking related safety measures is increased. The isobutyraldehyde-glyoxylic acid method has two different processes: the condensation-disproportionation process (JP.55-62080, 1980) comprising subjecting isobutyraldehyde and glyoxylic acid to aldol condensation, subjecting to disproportionation with another molecule of glyoxylic acid, and then subjecting to dehydration and cyclization to generate pantolactone; and the condensation-hydrogenation process (EP0171046) comprising catalytically hydrogenating the aldol-condensation product at a high pressure of 250 bar to prepare DL-pantolactone. The former has poor economy and environmental protection and thus no competitiveness because of twice amount of glyoxylic acid used and a large amount of wastewater generated; the latter requires a high pressure of 250 bar, which results in high equipment costs, high maintenance costs and poor safety, and thus the use thereof is greatly limited.

In order to overcome the disadvantages described above and to improve the production of pantothenic acid, D-pantothenate and the like, microbial synthesis methods have been the subject of research and have also been developed in recent years. The synthesis method only by microorganism has not been used for industrial production because of its low yield (EP2163629). The current industrial methods adopt chemical methods to generate precursors, followed by enzymatic resolution to obtain chiral D-pantothenic acid.

SUMMARY

The present disclosure provides a new preparation method for pantoic acid, pantothenic acid and panthenol as well as salts thereof, which is capable of at least partially solving the technical problems described above.

One object of the present disclosure is to provide a preparation method for pantoic acid, pantothenic acid or panthenol, comprising subjecting 2-hydroxy-3,3-dimethyl-4-oxobutanoic acid to fermentation conversion by using bacteria or yeast to prepare pantoic acid, pantothenic acid or panthenol.

Another object of the present disclosure is to provide a preparation method for D-pantothenic acid, comprising: 1) subjecting 2-hydroxy-3,3-dimethyl-4-oxobutanoic acid to fermentation conversion by using bacteria or yeast to prepare pantoic acid; and 2) reacting the pantoic acid with β-alanine to obtain D-pantothenic acid.

Still another object of the present disclosure is to provide a preparation method for D-panthenol, comprising: 1) subjecting 2-hydroxy-3,3-dimethyl-4-oxobutanoic acid to fermentation conversion by using bacteria or yeast to prepare pantoic acid; and 2) reacting the pantoic acid with β-alaninol to obtain D-panthenol.

According to the preparation method described above and provided herein, the 2-hydroxy-3,3-dimethyl-4-oxobutanoic acid can be directly fermented without reduction of aldehyde group outside microorganism, and the 2-hydroxy-3,3-dimethyl-4-oxobutanoic acid is reduced into 2,4-dihydroxy-3,3-dimethyl-butyric acid by using a reductase inside microorganism. In the method, low-cost raw materials are utilized, toxic cyanides and high-cost chiral resolution step are avoided.

DETAILED DESCRIPTION

In the present disclosure, unless otherwise indicated, scientific and technical terms used herein have the same meaning as commonly understood by those skilled in the art. Meanwhile, in order to better understand the present disclosure, definitions and explanations of related terms are provided below.

It should also be understood that the terms used herein are for the purpose of describing detailed embodiments only, and are not intended to be limiting.

As used herein and unless otherwise indicated, the term "pantoic acid" is 2,4-dihydroxy-3,3-dimethylbutyric acid. The term "pantothenic acid" refers to 2,4-dihydroxy-3,3-dimethylbutyryl-3-alanine. The term "panthenol" refers to 2,4-dihydroxy-N-(3-hydroxypropyl)-3,3-dimethylbutyramide.

The term "amplification" means that the intracellular activity of one or more enzymes in a microorganism which are encoded by suitable DNA is increased, for example by increasing the gene copy number, using strong promoters or using genes which encode suitable enzymes with high activity and optionally combining these methods.

The term "wild" refers to an object that can be found in nature.

Unless specifically stated, the terms "first" and "second" do not denote any order or priority, but rather the terms first, second, and the like are used to distinguish one object from another.

As used herein and unless otherwise stated, the term "about" refers to a measurable value such as an amount and a period of time, which comprises a variation of ±10%, more preferably ±5%, even more preferably ±1%, and still more preferably ±0.1% from a given value, so long as such variation is suitable for implementing the disclosed methods.

As described above, one of the objects of the present disclosure is to provide a preparation method for pantoic acid, pantothenic acid and panthenol as well as salts thereof, which is safe and environmentally friendly and has a high yield.

Some embodiments of the present disclosure disclose a preparation method for pantoic acid, pantothenic acid and panthenol as well as salts thereof, which are prepared by adding 2-hydroxy-3,3-dimethyl-4-oxobutanoic acid to a culture medium as a fermentation substrate and fermenting the substrate by using bacteria or fungi.

According to some embodiments of the present disclosure, wherein, when the fermentation substrate does not contain β-alanine, more pantoic acid and less pantothenic acid are obtained by fermenting the substrate by using bacteria or fungi.

According to some embodiments of the present disclosure, wherein pantoic acid and pantothenic acid can be simultaneously obtained by simultaneously adding 2-hydroxy-3,3-dimethyl-4-oxobutanoic acid and β-alanine to a culture medium as fermentation substrates and fermenting the fermentation substrates, with the amount of pantothenic acid obtained significantly increasing.

The reaction mechanism for preparing pantoic acid and pantothenic acid of the present disclosure is as follows:

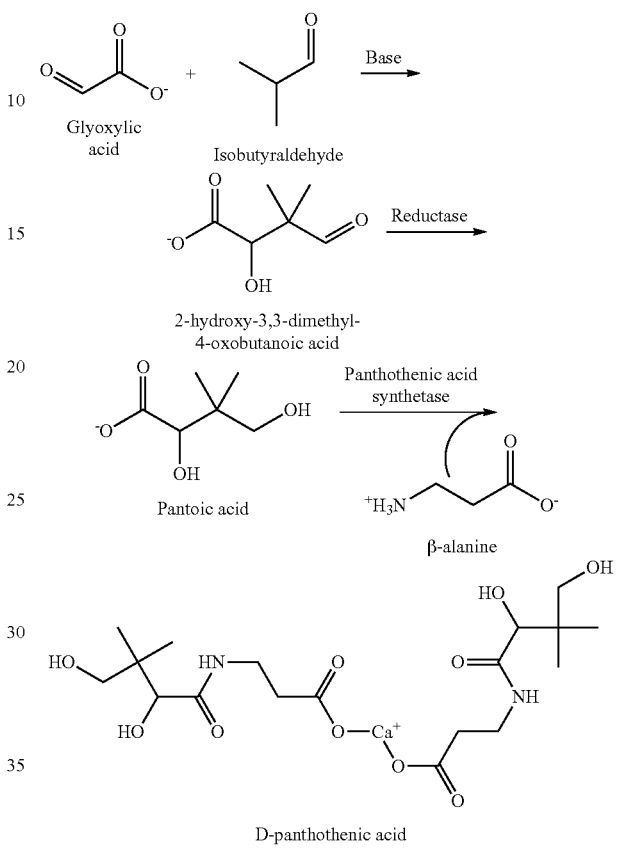

wherein, after the production of pantoic acid, the subsequent production of pantothenic acid can be achieved by using the publicly-reported chemical methods or biological fermentation methods; panthenol can be prepared by replacing β-alanine with β-alaninol, which can also be achieved by using the publicly-reported chemical methods or biological fermentation methods. According to some embodiments of the present disclosure, wherein the bacteria or fungi include, but are not limited to, wild or genetically engineered *Escherichia coli*, *Bacillus*, yeast, *Corynebacterium*, or *Streptomyces*, for example, *Escherichia coli*, *Bacillus subtilis*, *Bacillus megaterium*, *Bacillus amyloliquefaciens*, *Corynebacterium glutamicum*, *Saccharomyces cerevisiae*, *Candida utilis*, or *Pichia pastoris*.

According to some embodiments of the present disclosure, wherein the microorganism is selected from wild and genetically engineered *Escherichia coli*; optionally, the microorganism is selected from recombinant *Escherichia coli* containing an exogenous gene expressing a reductase, wherein the reductase includes YqhD, YqhE, DkgA, AdhE, Yihu, AdH1, ADH2, ADH5 or ADH6.

According to some embodiments of the present disclosure, an enzyme for subjecting the 2-hydroxy-3,3-dimethyl-4-oxobutanoic acid to fermentation is a reductase capable of converting aldehydes into alcohols. The reductase includes, but is not limited to, wild or genetically engineered YqhD, YqhE, AdhE, DkgA, Adh1, Adh2, Adh5, ADH6 or YihU.

According to some embodiments of the present disclosure, wherein the fermentation conversion of 2-hydroxy-3,3-dimethyl-4-oxobutanoic acid into pantoic acid, pantothenic acid or panthenol is accomplished inside bacterium or fungus by the reductase.

According to some embodiments of the present disclosure, wherein the fermentation conversion of 2-hydroxy-3,3-dimethyl-4-oxobutanoic acid into pantoic acid, pantothenic acid or panthenol is performed at 20° C. to 40° C. with addition of a carbon source. The carbon source includes, but is not limited to, glucose, starch, and the like. When fermentation is performed by using thermophilic bacteria or thermophilic enzymes, a fermentation temperature may be up to 90° C., and the fermentation temperature may be about 20° C., about 30° C., about 35° C., about 65° C., or about 90° C.

During fermentation, a pH regulator can be added according to the fermentation requirements. A pH value is adjusted by calcium carbonate, calcium hydroxide, sodium carbonate, sodium bicarbonate, sodium hydroxide, potassium carbonate or potassium hydroxide, and the fermentation product pantothenic acid and the pH regulator form corresponding salts to obtain calcium pantothenate, potassium pantothenate, sodium pantothenate or ammonium pantothenate.

According to some embodiments of the present disclosure, wherein the 2-hydroxy-3,3-dimethyl-4-oxobutanoic acid is prepared by condensing glyoxylic acid with isobutyraldehyde. The condensation reaction can be achieved by using publicly-reported preparation methods.

In another aspect, the present disclosure provides a preparation method for pantothenic acid and a salt thereof, which is obtained by reacting the pantoic acid obtained by fermentation with β-alanine. The present disclosure provides a preparation method for D-pantothenic acid, comprising: 1) subjecting 2-hydroxy-3,3-dimethyl-4-oxobutanoic acid to fermentation conversion by using bacteria or yeast to prepare pantoic acid; and 2) reacting the pantoic acid with β-alanine to obtain D-pantothenic acid.

In another aspect, the present disclosure provides a preparation method for panthenol, which is obtained by reacting the pantoic acid obtained by fermentation with β-alaninol.

The starting reagents added or the instruments or procedures used in the examples below are those that can be routinely determined by one of ordinary skill in the art.

EXAMPLE

Materials and Methods

The DNA polymerase Phanta Max Super-Fidelity DNA Polymerase, the ligase-independent single fragment quick Cloning Kit (ClonExpress® II One Step Cloning Kit) and the Agarose Gel DNA Extraction Kit used in the examples of the present disclosure were all purchased from Nanjing Vazyme Biotech Co., Ltd.

Biowest Agarose was used for DNA electrophoresis.

Casein Tryptone, yeast powder, D-(+)-glucose, potassium dihydrogen phosphate, sodium chloride, calcium chloride, ammonium chloride, D-calcium pantothenate, β-alanine, IPTG, thiamine and kanamycin sulfate were all purchased from Shanghai Sangon Biotech.

Calcium carbonate, sodium hydroxide and magnesium sulfate were purchased from Sinopharm.

Glyoxylic acid and isobutyraldehyde were purchased from Aladdin.

Agar powder used to prepare a solid medium was purchased from Shanghai Shengsi.

Plasmid construction sequencing validation was done by Genewiz, Inc.

LB medium composition: 10 g/L of casein tryptone, 5 g/L of yeast powder and 10 g/L of sodium chloride, and 1.5% of agar powder was added to a solid medium.

Concentration of antibiotics: 50 μg/mL of kanamycin sulfate.

The fermentation substrate 2-hydroxy-3,3-dimethyl-4-oxobutanoic acid was prepared by condensing glyoxylic acid with isobutyraldehyde by using the conventional method.

Fermentation Medium Components:

| Components | Concentration |
|---|---|
| M9 salts | 1X |
| Magnesium sulfate | 1 mM |
| Calcium chloride | 0.1 mM |
| Thiamine | 0.01 mg/mL |
| D-glucose | 40 g/L |
| Yeast powder | 5 g/L |
| IPTG | 1 mM |
| β-alanine | 0 g/L or 7.5 g/L |
| 2-hydroxy-3,3-dimethyl-4-oxobutanoic acid | 10 g/L |
| Kanamycin sulfate | 50 μg/mL |

Detection method of pantoic acid and pantothenic acid was as follows: pantothenic acid was quantitatively detected using HPLC-RID equipped with a Bio-Rad Column (1250140 Amincx HPX-87H Column 300×7.8 mm).

Example 1: Construction of *Escherichia Coli* Reductase Expression Vector

Primers were designed based on the genomic sequence of *Escherichia coli* MG1655 published by NCBI:

```
yqhE_F(SEQ ID No: 1,
gaccgaattcattaaagaggagaaaggtaccatggctaatccaaccgtt attaagctacag)/ yqhE_R(SEQ ID No: 2,
ctttcgttttatttgatgcctctagagctagcttagccgccgaactggt caggatcgggaccgag)
and yihU_F(SEQ ID No: 3,
gaccgaattcattaaagaggagaaaggtaccatggcagcaatcgcgttt atcggtttagg)/ yihU_R(SEQ ID No: 4,
ctttcgttttatttgatgcctctagagctagcttacattttactttgg cagtcatcccggcactg)
```

The genes yqhE and yihU were respectively obtained by PCR amplification by taking MG1655 genome as a template and connected to a pZA vector containing an IPTG inducible promoter by using ligase-independent single fragement quick Cloning Kit, After BW25113 competent cells were transformed, the transformed cells was plating on kanamycin sulfate resistant plate for overnight culture. The positive clone was selected for sequencing verification, and correct recombinant vectors were respectively named as pZA-yqhE and pZA-yihU.

Example 2: Production of Pantoic Acid and Pantothenic Acid by Fermentation of Recombinant *Escherichia Coli*

The recombinant bacteria described above were inoculated into 2 mL of LB liquid media containing 50 μg/mL of kanamycin sulfate and cultured overnight at 37° C. and 220 rpm (about 14 h). The resulting media were transferred to a 100-mL conical flask containing 5 mL of fermentation medium at an initial OD of 0.05 and incubated at 30° C. and 220 rpm. 0.5 g of $CaCO_3$ was added to each fermentation flask to adjust the pH value of the fermentation broth. After 24 h incubation, the fermentation broth was collected, and the concentrations of pantoic acid and pantothenic acid were determined (see table below). The YqhE and YihU proteins promoted the reduction of the substrate 2-hydroxy-3,3-dimethyl-4-oxobutanoic acid into pantoic acid. When the fermentation broth was supplemented with another substrate β-alanine, the final product pantothenic acid could be produced. However, the fermentation results showed that there was a rate-limiting step in the metabolic pathway for converting pantoic acid to pantothenic acid, and in order to increase the yield of pantothenic acid, it was necessary to further increase the expression of enzymes required for downstream metabolic pathways. In this embodiment, $CaCO_3$ was adopted to adjust the pH of the fermentation broth, and the fermentation product pantothenic acid was formed into calcium pantothenate in the fermentation broth. If NaOH, KOH or aqueous ammonia was added to adjust the pH of the fermentation broth, sodium salt, potassium salt or ammonium salt of pantothenic acid was correspondingly generated in the fermentation broth.

| Strain | Substrates 2-hydroxy-3,3-dimethyl-4-oxobutanoic acid | β-alanine | Product (g/L) | |
|---|---|---|---|---|
| | | | Pantoic acid | Pantothenic acid |
| BW25113 | 10 g/L | 0 g/L | 3.7 | 0.0 |
| BW25113/pZA-yqhE | 10 g/L | 0 g/L | 6.9 | 0.1 |
| BW25113/pZA-yihU | 10 g/L | 0 g/L | 7.6 | 0.1 |
| BW25113 | 10 g/L | 7.5 g/L | 1.8 | 4.4 |
| BW25113/pZA-yqhE | 10 g/L | 7.5 g/L | 4.8 | 3.9 |
| BW25113/pZA-yihU | 10 g/L | 7.5 g/L | 3.1 | 6.4 |

The invention claimed is:

1. A method for preparing pantoic acid or pantothenic acid or panthenol, or salts thereof, comprising a step of fermenting a substrate by a microorganism in a fermentation broth to form pantoic acid, wherein the substrate comprises 2-hydroxy-3,3-dimethyl-4-oxobutanoic acid, and the microorganism is recombinant *Escherichia coli* containing an exogenous gene expressing a reductase, wherein the reductase is YihU.

2. The method according to claim 1 for preparing pantothenic acid, further comprising reacting the pantoic acid with β-alanine to form pantothenic acid, wherein the β-alanine is present in the substrate or the β-alanine is added to the fermentation broth.

3. The method according to claim 1 for preparing panthenol, further comprising reacting the pantoic acid with β-alaninol to form panthenol, wherein the β-alaninol is present in the substrate or the β-alaninol is added to the fermentation broth.

4. The method according to claim 1, wherein a fermentation temperature is 20° C. to 90° C.

5. The method according to claim 1, further comprising condensing glyoxylic acid with isobutyraldehyde to obtain the 2-hydroxy-3,3-dimethyl-4-oxobutanoic acid.

6. The method according to claim 2, wherein the pantothenic acid is D-pantothenic acid.

7. The method according to claim 2 for preparing a salt selected from calcium pantothenate, potassium pantothenate, sodium pantothenate, and ammonium pantothenate, wherein the method further comprises adjusting a pH value of the fermentation broth by adding to the fermentation broth a pH regulator selected from calcium carbonate, calcium hydroxide, sodium carbonate, sodium bicarbonate, sodium hydroxide, potassium carbonate or potassium hydroxide in the fermentation.

8. The method according to claim 3, wherein the panthenol is D-panthenol.

* * * * *

```
SEQUENCE LISTING

<160> NUMBER OF SEQ ID NOS: 4

<210> SEQ ID NO 1
<211> LENGTH: 61
<212> TYPE: DNA
<213> ORGANISM: artificial sequence
<220> FEATURE:
<223> OTHER INFORMATION: synthetic

<400> SEQUENCE: 1
gaccgaattc attaaagagg agaaaggtac catggctaat ccaaccgtta ttaagctaca     60
g                                                                    61

<210> SEQ ID NO 2
<211> LENGTH: 65
<212> TYPE: DNA
<213> ORGANISM: artificial sequence
<220> FEATURE:
<223> OTHER INFORMATION: synthetic

<400> SEQUENCE: 2
ctttcgtttt atttgatgcc tctagagcta gcttagccgc cgaactggtc aggatcggga     60
ccgag                                                                65

<210> SEQ ID NO 3
<211> LENGTH: 60
<212> TYPE: DNA
<213> ORGANISM: artificial sequence
<220> FEATURE:
<223> OTHER INFORMATION: synthetic

<400> SEQUENCE: 3
gaccgaattc attaaagagg agaaaggtac catggcagca atcgcgttta tcggtttagg     60

<210> SEQ ID NO 4
<211> LENGTH: 66
<212> TYPE: DNA
<213> ORGANISM: artificial sequence
<220> FEATURE:
<223> OTHER INFORMATION: synthetic
```

-continued

```
<400> SEQUENCE: 4
ctttcgtttt atttgatgcc tctagagcta gcttacattt ttactttggc agtcatcccg    60
gcactg                                                                66
```